Figure 1:
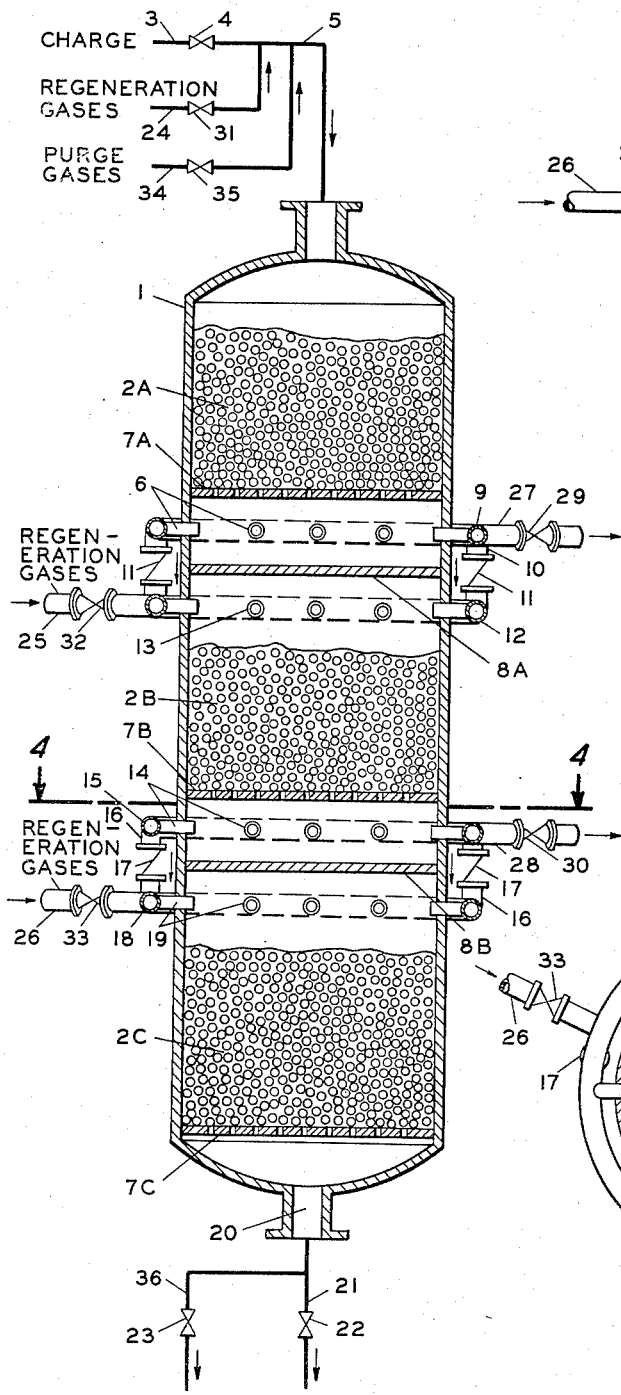

Dec. 25, 1951  W. L. HOUSTON, JR  2,579,672
CATALYST CHAMBER
Filed Nov. 28, 1947

INVENTOR.
W. L. HOUSTON, JR.
BY
Hudson & Young
ATTORNEYS

Patented Dec. 25, 1951

2,579,672

UNITED STATES PATENT OFFICE 2,579,672

CATALYST CHAMBER

William L. Houston, Jr., Phillips, Tex., assignor to Phillips Petroleum Company, a corporation of Delaware Application November 28, 1947, Serial No. 788,470

6 Claims. (Cl. 23—288)

This invention relates to apparatus for the treatment of fluids with catalysts or other solid contact materials at elevated temperatures. In one specific embodiment this invention relates to apparatus for continuous catalytic hydrocarbon conversion processes wherein the activity level of individual units of the catalyst is periodically restored by reactivation in situ.

In the use of solid granular catalyst for effecting various reactions of hydrocarbons, as exemplified by cracking, reforming, dehydrogenating, or the like, carbonaceous matter is progressively deposited on the catalyst, making it imperative to reactivate such catalysts periodically in order to maintain the catalyst at an economical conversion level. Such a reactivation is usually effected by removing the catalyst units from processing duty and thereafter passing combustion-supporting gases through the said catalytic units until the required reactivation is attained. It may be readily perceived that such a reactivating procedure is economically wasteful, resulting not only in an undesirably large loss of hydrocarbon conversion products during the reactivating period but also in the incurrence of such additional expenditures as are demanded by the reactivation process. It is also apparent that when employing a particular type of catalyst best suited to a particular hydrocarbon conversion reaction, the only feasible manner of decreasing the length of the reactivation period is accomplished through an acceleration of the rate of carbon removal. This objective can be realized in several different ways, each of which possesses a practical limitation. One such manner of accelerating the carbon removal rate is to increase the concentration of combustion-supporting gas in the reactivation gases with a consequent increase in the temperature level at which the carbon combustion reaction proceeds; however, it is impossible to increase the catalyst reactivation temperature above a certain critical level inherent in each type of catalyst without permanently destroying the original activity of the catalyst. Further, exceedingly high reactivation temperatures often result in a fusion of the individual catalyst granules thereby rendering a thorough reactivation difficult if not impossible.

An alternative manner of increasing the rate of carbon removal is to increase the space velocity, that is, the volume of fluid throughput per unit of time per unit of catalyst volume, of the reactivation gas and thereby increase the mass rate of combustion gas contacting a unit of catalyst. The attainment of combustion gas space velocities of a high order will not only result in an increased rate of carbon removal but also in a more effective removal of heat generated by the highly exothermic reactivation process. Therefore, the combustion-supporting gas concentration of the reactivation gas may be increased to compensate for this additional heat removal and thus the final result is a maximum rate of carbon removal which is the desired object of the process. However, the employment of combustion gas space velocities of desirable values will result in prohibitive pressure drops through the catalyst masses unless my invention as hereinbelow set forth is practiced.

A principal object of my invention is to provide an improved apparatus for the catalytic conversion of hydrocarbons. Another object is to provide an improved apparatus for the reactivation in situ of catalyst laden with combustible material from the conversion of hydrocarbons. A further object is to provide means for improving the operation of apparatus which is used at elevated temperatures for the contacting of a mass of solid material with two different fluids successively. Yet another object is to increase the rate of combustion of carbonaceous deposits from a solid contact catalyst without undesirably increasing the temperature or the space velocity of the reactivation gases. A still further object is to provide an improved and simplified valving system for controlling flow of reactants and of reactivation gases, with particular emphasis on the prevention of overheating of the valves, and on automatic operation.

Figure 3:
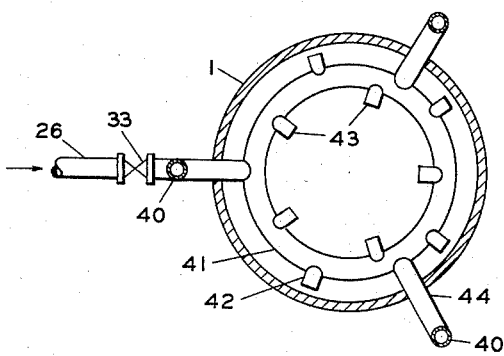
Figure 2:
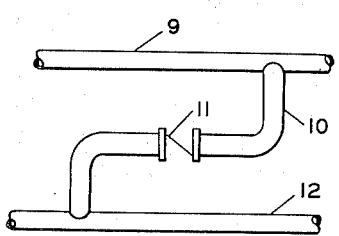
Figure 4:
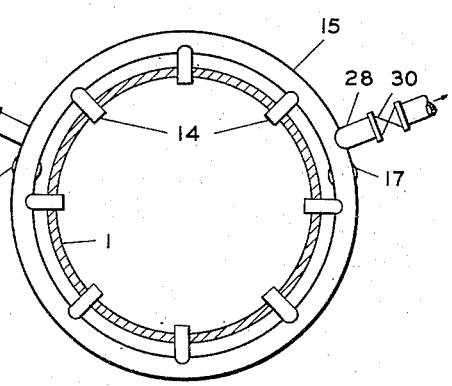

Numerous other objects will appear hereinafter from a consideration of the following illustrative description taken in conjunction with the accompanying drawings. Figure 1 represents diagrammatically, with catalyst chamber in vertical section, one form of apparatus suitable for use in carrying out the present invention. Figure 2 represents a variation of one feature of the apparatus shown in Figure 1. Figure 3 is a plan view of a reactor in horizontal cross section, in which internal collecting and distributing conduits are employed, with external valves. Figure 4 is a horizontal cross-section of the reactor shown in Figure 1, taken along the line 4—4.

In accordance with my invention, the catalyst masses are arranged in a plurality of vertically spaced separate sections or beds, each supported by a foraminous member disposed a substantial distance above an imperforate member which, in turn, is disposed a substantial distance above the next lower catalyst mass. Thus each catalyst mass or bed is supported in a sealed, gas-tight chamber. The individual catalyst masses comprising the catalytic reactor unit may be two or more in number and are so related that while on stream, the hydrocarbon is passed through the beds in series, i. e. through the entire depth of catalyst, until conversion becomes uneconomical due to the deposition of combustible carbonaceous material on the catalyst. Thereupon the converter is taken off-stream and placed on reactivation. In reactivation, in accordance with my invention, an independent stream of combustion-supporting, e. g. oxygen containing reactivation gas, independently controlled as to amount, flow rate, temperature and oxygen content, is introduced into the top of each chamber containing the individual catalyst beds comprising the catalytic converter and simultaneously the effluent oxygen-denuded reactivation gases are withdrawn from a point below the foraminous member supporting each catalyst bed. Thus, catalyst reactivation occurs in parallel while hydrocarbon conversion occurs in series across the beds comprising the converter.

In my invention the gases passing through the catalyst chamber in contact with the catalyst are substantially (and usually entirely) the sole heat transfer medium. That is, the influent hydrocarbon gases (plus a heat carrier, if used, such as steam) are the sole heat transfer medium during the on-stream operation. And likewise the reactivation gases are the sole heat transfer medium during reactivation. Thus, the necessity for using an extraneous heat exchange fluid and a system for conducting the same through the bed to control the temperature is avoided. Such a method of temperature control is very expensive and increases the size of the catalytic converter unduly. With my invention no such elaborate precautions are necessary.

In the preferred embodiment of my invention the several catalyst beds comprising the catalytic converter are of a depth selected on a basis designed to give an economic balance between the several factors hereinbelow discussed.

From the preceding discussion of such factors as combustion-supporting gas content of reactivation gas, space velocity, and the like, it will be seen that the ideal catalytic converter would consist of an infinite number of catalyst beds situated in accordance with my invention so that the necessary hydrocarbon conversion contact time in series would be realized while at the same time realizing an infinitely short reactivation time by reason of a simultaneous contact of reactivation gas with all bodies of catalyst in parallel and thereby achieving an instantaneous removal of carbonaceous deposits. However, since practical consideration of the catalytic converter size and the allowable pressure drop limits the number of catalyst beds to some finite number, the choice of such a number resides in an economic balance between the original investment costs and the daily operating costs. It is contemplated that the usual catalytic converter employing the principles of my invention as a major design feature will consist of at least two such catalyst beds with perhaps eight or thirty-two or even more, being frequently employed. I do not wish to limit the scope of my invention by a consideration of arbitrary decisions involving plant capacities.

Heretofore, patents have been granted which involve the fundamental principle of series processing and parallel reactivation through a plurality of catalyst beds. However, to the best of my knowledge, those systems which are capable of practical attainment are predicated upon the use of a plurality of individual catalytic converters each containing a single bed of catalyst and so externally coupled as to permit the flow of hydrocarbons and reactivants as described hereinbefore. Other patents have been issued which presume to combine a plurality of catalystic converters into a single converter containing multiple catalyst beds and featuring means of achieving the desired series-parallel flow such as internally situated valves, shutters and the like. Such combinations while achieving the theoretical objects upon which they are based, namely a single converter with a plurality of catalyst beds operated on the series-parallel flow principle, fail in practical achievement in that they embody internal valving exposed to the extreme temperatures necessary for the catalytic process. The state of the metallurgical art today is not such as to allow the large, closely fitting valve elements of the prior inventions to be used except in those processes employing comparatively low temperatures, say less than 900° F.

Since the majority of hydrocarbon conversions involve temperatures in excess of the thermal limits of such valve mechanisms rendering them inoperable under such conditions, and since my invention provides valving arrangements suitable for practical operation at the said high temperature levels, it is apparent that my invention will find a wide application in the petroleum and chemical fields.

In order to describe the invention further, reference will now be made to the accompanying drawing. Figure 1 shows a catalyst chamber 1 in which the catalyst is disposed in separate layers or beds 2A, 2B and 2C which are supported upon the foraminous members 7A, 7B and 7C. Each catalyst bed except the last is sealed from the succeeding bed by means of imperforate partitions, 8A and 8B, so that the catalyst beds comprise in totality the unitary converter 1. The flow of hydrocarbon vapors during the processing period is through the catalyst beds, 2A, 2B and 2C, in series. Entering through line 3, valve 4 and line 5 at the top of the converter, the said vapors thence flow downwardly through the first catalyst bed 2A into the space between foraminous member 7A and imperforate member 8A. Connected with this space is a series of radial collector pipes 6, which in turn are connected with a concentric collector ring 9. The vapors are conducted through pipes 6, ring 9, one or more lines 10, a corresponding number of valves 11, and thence through the concentric distribution ring 12 and radial lines 13 to the catalyst bed 2B. After the hydrocarbon vapors flow through the catalyst bed 2B, they flow through lines 14, collector ring 15, line or lines 16, valve or valves 17, distribution ring 18, and lines 19, in that order, into catalyst bed 2C. After passing down through catalyst bed 2C, the hydrocarbon vapors flow through the outlet 20 to line 21 and valve 22 and hence to further conventional processing steps not shown.

The forms assumed by the pipes 6 and 14 and by the collector rings 9 and 15 need not necessarily be identical to those indicated in the drawing but may be widely varied to advantageously adapt such forms to the purposes contemplated in any specific application. For example, the collector rings 9 and 15 and the distribution rings 12 and 18 may be situated inside the converter 1 so as to lie between the catalyst support members 7A and 7B and the corresponding imperforate members 9A and 8B, and between the imperforate members 8A and 8B and the top of the catalyst beds 2B and 2C, respectively, and this is shown in Figure 3, described below. Also, it is feasible to entirely omit the collector rings 9 and 15 and the distributor rings 12 and 18 and substitute therefor the lines 6 and 13 and the lines 14 and 19 with the connecting lines 10 and 16 containing the valves 11 and 17 respectively. Thus, many types of collection and distribution systems may be incorporated into the invention without departing from the spirit of the same. It is important, however, that the valves 11 and 17 be externally located with respect to the chamber 1.

At the end of the processing period, hydrocarbons are purged from the catalytic converter, if such step is desirable, by means of steam or other inert gas introduced through line 34, valve 35 and line 5 into the top of the converter for passage therethrough, and vented either through line 21 and valve 22 to recover the hydrocarbons or directly out line 36 and valve 23. The reactivation is then achieved by means of a reactivation gas of suitable oxygen content admitted through lines 24, 25 and 26 and their valves 31, 32 and 33 into the catalyst beds 2A, 2B and 2C respectively. These individual reactivation gas streams pass through their respective beds at combustion temperatures and thereby reactivate the catalyst by combustion of the carbonaceous material. The reactivation gases along with the combustion products of the reactivation reaction exit from catalyst beds 2A and 2B through lines 6 and 14 to collector rings 9 and 15 and thence leave the system through lines 27 and 28 and valves 29 and 30, respectively. The reactivation gases entering catalyst bed 2C through line 26, valve 33, collector ring 18 and lines 19, in that order, will exit through line 36 and valve 23. The reactivation gases leaving the individual catalyst beds 2A, 2B and 2C via lines 27, 28 and 36 may be returned by way of suitable lines, coolers, filters and the like (not shown) to lines 24, 25 and 26 for addition of oxygen or air and recirculation through the catalyst beds. After reactivation is completed and before hydrocarbon vapors are readmitted to the catalyst chamber, oxygen-containing gases may be purged from the chamber by means of steam or inert gas introduced by the same means 34 used for the purging prior to reactivation.

A major feature of my invention resides in the utilization of check valves to replace the ordinary valves 11, 17, 32 and 33, so as to permit switching from hydrocarbon processing to catalyst reactivation and from catalyst reactivation to hydrocarbon processing without manually opening and closing the various valves situated in the lines connecting the various catalyst bed sections. It can be readily perceived that such substitution results in a great saving of labor where the number of catalyst beds per converter is increased to obtain the objectives outlined above. With a system of check valves as I am about to describe, the major mechanical disadvantages, i. e. increased labor and non-simultaneousness in switching of valves, of a converter containing a plurality of beds situated for series process flow and parallel reactivation flow is overcome and such a converter can then be operated in a manner similar to a converter containing a single catalyst bed. This advantageous feature of incorporating check valves for semi-automatic operation can be achieved only because I have found a mode of converter construction which allows such valves to remain outside of the converter shell unexposed to hot process gasses, such location permitting sufficient cooling by means of ordinary radiation and the like, to the comparatively cold atmospheric air in order to maintain the temperature of the valves at a practical working level. If such valves were situated inside the catalytic converter and were enveloped by the hot process gases, effective heat dissipation by radiation or convection would be impossible and the valves would assume a temperature very closely approximating that of the surrounding gases. In most catalytic hydrocarbon reactions and regenerations, such a temperature is greatly in excess of that at which any kind of valve will successfully operate without failure through fatigue, binding, warping, crystallization or the like.

In one specific embodiment of my invention as shown in Figure 1, valves 11, 17, 32 and 33 are check valves oriented as hereinbelow described. Valves 11 and valves 17 are situated so that the fluid flow may occur in a downward direction but not in an upward direction. Valve 32 and valve 33 are situated so that fluid flow in lines 25 and 26, respectively, may be towards the converter, i. e., into the distribution rings 12 and 18, but not away from the converter, i. e. out of the distribution rings 12 and 18. When employing check valves arranged as described above, the hydrocarbon vapor during the series flow process phase of the operating cycle will enter the converter through line 3, valve 4 and line 5 After flowing through catalyst bed 2A, the hydrocarbon vapors will enter collector ring 9 via lines 6 and thence flow through line 10 and force check valves 11 open. As the said vapors enter distributor ring 12, they force check valve 32 shut and thereafter flow into catalyst bed 2B via lines 13. A like result occurs as the gases flow from catalyst bed 2B into catalyst bed 2C via lines 14, collector ring 15, line 16, check valve or valves 17, distributor ring 18 and lines 19 in that order. During the parallel flow reactivation phase of the operating cycle, oxygen-containing reactivation gases enter catalyst beds 2A, 2B and 2C through lines 24, 25 and 26 respectively. The reactivation gas flowing into catalyst bed 2B enters through line 25 and forces check valve 32 open permitting flow to the downstream side of check valves 11 thereby forcing these latter valves closed. The reactivation gases then flow through lines 13 via distributor ring 12 and hence through the catalyst bed 2B. After flowing through the said catalyst bed, the reactivation gases leave the converter 1 via lines 14, collector ring 15, line 28 and manually operated valve 30. The reactivation gas flow into catalyst bed 2A is through manually operated valve 31 in the manner hereinbefore described and out of catalyst bed 2A via lines 6, collector ring 9, line 27 and manually operated valve 29. The reactivation gases flow into catalyst bed 2C via line 26, check valve 33, distributor ring 18 and lines 19 in a manner analogous to the reactivation gas flow into catalyst bed 2B, causing check valves 17 to close. The spent reactivation gases exit from catalyst bed 2C through line 36 and manually operated valve 23 in the usual manner.

It can readily be perceived from the above description that the application of check valves in my invention instead of manually operated valves decreases the labor demanded for switching from the process phase to the reactivation phase or vice versa in an operating cycle by more than forty per cent in the specific apparatus described above. In actual practice, the savings in labor may amount to as much as ninety per cent of that required in a convertor employing manually operated valves throughout.

In certain situations some difficulty relative to the operation of the vertical check valves as described above may arise when the number of catalyst beds per converter is increased to several, say 5 or 6 or more, in order to decrease the reactivation gas pressure drop across each individual bed. In applications of this invention where the number of beds per converter is thus large enough to result in a very small reactivation gas pressure drop across the individual catalyst beds, the available difference in pressure between the outlet of one bed and the inlet of the succeeding bed will likewise be very small and such difference in pressure often is not large enough to successfully operate a simple check valve located in a vertical position. In such an event, there are several alternative means of correcting this fault.

One such alternative means is shown in Figure 2 wherein such means with reference to check valves 11 is illustrated, but it is to be understood that valves 17 can likewise be so adapted. In Figure 2, the check valves 11 and/or 17 are located so as to be in a horizontal run of lines 10 and/or 16, thereby requiring less pressure differential for their operation. In this specific instance, the fluid flow corresponds to that described above with reference to Figure 1.

Another suitable alternative means to correct the said fault of vertically placed check valves resides in the employment of spring-loaded check valves as valves 11 and valves 17. Such spring-loaded valves may also be used to replace valves 32 and 33. Spring-loaded check valves of various types are well known in the art and consist essentially of a spring coacting with the valve clapper so as to require less differential pressure for closing against a back flow.

Still another alternative is to operate the reactivation phase of the operating cycle so as to maintain succeedingly higher pressures in succeedingly lower catalyst beds. For example, reactivation gas admitted through line 26 to catalyst bed 2C would be maintained at a higher pressure than that admitted to catalyst bed 2B through line 25. Thus, the pressure differential across the valves 11 and valves 17 is increased and the closing of such valves thereby ensured. Such a procedure may be applied to vertically placed check valves, horizontally placed check valves, or spring-loaded check valves, or any combination thereof.

Figure 3 is a view looking downwardly on a set of internal distributing conduits installed in a chamber which is shown in horizontal cross section. The numeral 1 designates the shell of the chamber. Annular distributing conduit 41 is placed in a horizontal plane entirely inside the chamber, just below an imperforate diaphragm member such as element 8B in Figure 1, and just above the top surface of the catalyst bed. Several branches 42 and 43 may serve to distribute gases evenly to the catalyst, or conduit 41 may be perforated to accomplish proper distribution. Hydrocarbon vapors or reactivation gases as the case may be, flow into conduit 41 from outside the chamber via lines 44, which are shown three in number by way of example. Vertical valve containing conduits 40 supply lines 44 with the hydrocarbon vapors from the preceding catalyst bed, while one or more horizontal conduits 26 containing valve 33 supply the reactivation gases during that part of the operating cycle. A corresponding arrangement of internal conduits and external valves is provided for collecting gases after passage through a catalyst bed.

As pointed out before, my apparatus in its various forms may be utilized to advantage wherever masses of solids must be contracted with two fluids alternately at high temperatures, and finds its most usual application in the field of catalyzed organic chemical conversions. Perhaps the most important commercially is the catalytic cracking of hydrocarbons, wherein cracking temperatures may ordinarily range from 850 to 1100° F. with activated clay or synthetic silica-alumina type catalysts, on up to as high as say 1400° F. with the more rugged bauxite catalyst. Reactivations are carried out usually above 1000° F., on up to 1500° F., depending on the stability of the particular catalyst. The catalyst is customarily used in the form of stationary beds of granules, pills or pellets ranging in size from 8 or 10 mesh to about 40 or 50 mesh. Suitable reaction conditions and catalysts for effecting various other reactions are well known to the art, and hence need not be detailed here. While down-flow through the catalyst beds has been emphasized hereinabove, it will be appreciated that a similar arrangement of conduits and valves may be employed for up-flow operations, with modifications obvious to one skilled in the art.

Other modes of applying the principles of my invention may be employed, changes being made as regards the details described, provided the features stated in the claims, or the equivalent of such, be employed.

I claim:

1. Apparatus for effecting hydrocarbon conversions in the presence of solid catalytic material in a divided form, comprising a vertical vessel, a plurality of foraminous members spaced vertically apart in the said vessel and each supporting a bed of catalyst, imperforate diaphragm members spaced below each foraminous member except the lowermost, fluid collecting conduit means spaced between each said foraminous member and next inferior imperforate member, fluid distributing conduit means spaced between each said imperforate member and next inferior catalyst bed, external check valve-containing conduit means connecting adjacent collecting means and distributing means for allowing series flow through said apparatus during conversion, said check valves being adapted to be opened during conversion and closed during reactivation, check valve-containing means for independently introducing fluid into each said distributing means, last said check valve being adapted to be opened during reactivation and closed during conversion, means for independently removing fluid from each said collecting means, means for introducing fluids into the top of said vessel, and means for removing fluids from the bottom of said vessel.

2. Catalytic apparatus comprising a vertical vessel containing a plurality of separate catalyst chambers, a foraminous member in each of said chambers to support the catalyst contained therein, conduit means for introducing fluid into the top one of said chambers and means for removing fluid from the bottom one of said chambers, a plurality of vertically spaced internal fluid collecting conduit rings each contained in a space defined by the bottom of each of the said chambers except the lowermost chamber and the foraminous member spaced therein, a plurality of vertically spaced internal fluid distributing conduit rings each contained in a corresponding space defined by the top of each of the catalyst chambers except the topmost chamber and the top of the catalyst bed contained therein, external conduits having check valves associated therewith connecting the said collecting conduit rings and the said distributing conduit rings for allowing series flow through the chambers during conversion said check valves being adapted to be opened during conversion and closed during reactivation, independent conduits for withdrawing fluids from each fluid collecting conduit ring, and independent conduits containing check valves for introducing fluid into each distributing conduit ring, said check valves being adapted to be opened during reactivation and closed during conversion.

3. Catalytic apparatus comprising a vertical vessel containing a plurality of separate catalyst chambers, a foraminous member vertically spaced in each of said chambers to support the catalyst contained therein, an independent conduit for introducing fluids into the top of the said vessel, an independent conduit for withdrawing fluid from the bottom of the said vessel, a plurality of vertically spaced external annular collecting conduit rings each adjacent a space defined by the bottom of each of the said chambers except the lowermost chamber and the foraminous member spaced therein and connected with the said spaces by a plurality of conduits radial to the vertical axis of the said vessel, a plurality of vertically spaced external annular distributing conduit rings each adjacent a corresponding space defined by the top of each of the catalyst chambers except the topmost chamber and the top of the catalyst bed contained therein and connected with the adjacent space by a plurality of conduits radial to the vertical axis of the said vessel, conduits having check valves associated therewith connecting said collecting conduit rings and said distributing conduit rings for allowing series flow through the said chambers during conversion, said check valves being adapted to be open during conversion and closed during reactivation, independent conduits for withdrawing fluid from each annular collecting conduit ring, independent fluid conduits containing check valves and connected to each annular distributing conduit ring, said check valves being adapted to be open during reactivation and closed during conversion.

4. The apparatus of claim 3 wherein the check valves are spring loaded.

5. Catalytic apparatus comprising a vertical vessel containing a plurality of separate catalyst chambers, a foraminous member vertically spaced in each of said chambers to support the catalyst contained therein, an independent conduit for introducing fluid into the top of the said vessel, an independent conduit for withdrawing fluid from the bottom of the said vessel, a plurality of vertically spaced external annular effluent collecting conduit rings each adjacent a space defined by the bottom of each of the said chambers except the lowermost chamber and the foraminous member spaced therein and connected with the said spaces by a plurality of conduits radial to the vertical axis of the said vessel, a plurality of vertically spaced external annular influent distributing conduit rings each adjacent a corresponding space defined by the top of each of the catalyst chambers except the topmost chamber and the top of the catalyst bed contained therein and connected with the adjacent space by a plurality of conduits radial to the vertical axis of the said vessel, conduits having check valves associated therewith connecting adjacent annular effluent and influent conduit rings for allowing series flow through the said chambers during conversion, said check valves being adapted to be open during conversion and closed during reactivation, independent conduits for withdrawing fluid from each annular effluent collecting conduit ring, independent fluid influent conduits containing check valves and connected to each annular influent distributing conduit ring, said check valves being adapted to be open during reactivation and closed during conversion, fluid pressure controlling means connected to said fluid influent conduits whereby each succeedingly inferior catalyst bed may be reactivated at a pressure greater than that of the preceding bed.

6. Catalytic apparatus comprising a vertical vessel containing a plurality of separate catalyst chambers, a foraminous member vertically spaced in each of said chambers to support the catalyst contained therein, an independent conduit for introducing fluid into the top of the said vessels, an independent conduit for withdrawing fluid from the bottom of the said vessel, a plurality of vertically spaced external annular effluent collecting conduit rings each adjacent a space defined by the bottom of the said chambers except the lowermost chamber and the foraminous member spaced therein and connected with the said space by a plurality of conduits radial to the vertical axis of the said vessel, a plurality of vertically spaced external annular influent distributing conduit rings each adjacent a corresponding space defined by the top of each of the catalyst chambers except the topmost chamber and the top of the catalyst bed contained therein and connected with the adjacent space by a plurality of conduits radial to the vertical axis of the said vessel, conduits having horizontally disposed check valves associated therewith connecting adjacent annular effluent and influent conduit rings for allowing series flow through the said chambers during conversion, said check valves being adapted to be open during conversion and closed during reactivation, independent conduits for withdrawing fluid from each annular effluent collecting conduit ring, independent fluid influent conduits containing horizontally placed check valves for introducing fluid into each annular influent distributing conduit ring, said check valves being adapted to be open during reactivation and closed during conversion, and fluid pressure controlling means connected to the said fluid influent conduits whereby each succeedingly inferior catalyst bed may be reactivated at a pressure greater than that of the preceding bed.

WILLIAM L. HOUSTON, Jr.

REFERENCES CITED

The following references are of record in the file of this patent:

UNITED STATES PATENTS

| Number | Name | Date |
|---|---|---|
| 1,252,976 | Wells | Jan. 8, 1918 |
| 1,747,634 | Isenberg | Feb. 18, 1930 |
| 2,223,268 | Plummer | Nov. 26, 1940 |
| 2,273,089 | Carpenter | Feb. 17, 1942 |
| 2,278,892 | Nagle | Apr. 7, 1942 |
| 2,289,063 | Ocon et al. | July 7, 1942 |
| 2,363,188 | McDorman | Nov. 21, 1944 |
| 2,366,567 | Shultz | Jan. 2, 1947 |